P. MICHELS.
Strainer for Pots.

No. 165,354. Patented July 6, 1875.

Witnesses.
Otto Hufeland
Chas. Wahlers.

Inventor.
Peter Michels
p.
Van Santvoord & Hauff
Attys

UNITED STATES PATENT OFFICE

PETER MICHELS, OF BROOKLYN, NEW YORK.

IMPROVEMENT IN STRAINERS FOR POTS.

Specification forming part of Letters Patent No. 165,354, dated July 6, 1875; application filed May 12, 1875.

*To all whom it may concern:*

Be it known that I, PETER MICHELS, of Brooklyn, in the county of Kings and State of New York, have invented a new and useful Improvement in Strainers for Pots and other Vessels, which improvement is fully set forth in the following specification, reference being had to the accompanying drawing, in which—

Figure 1:
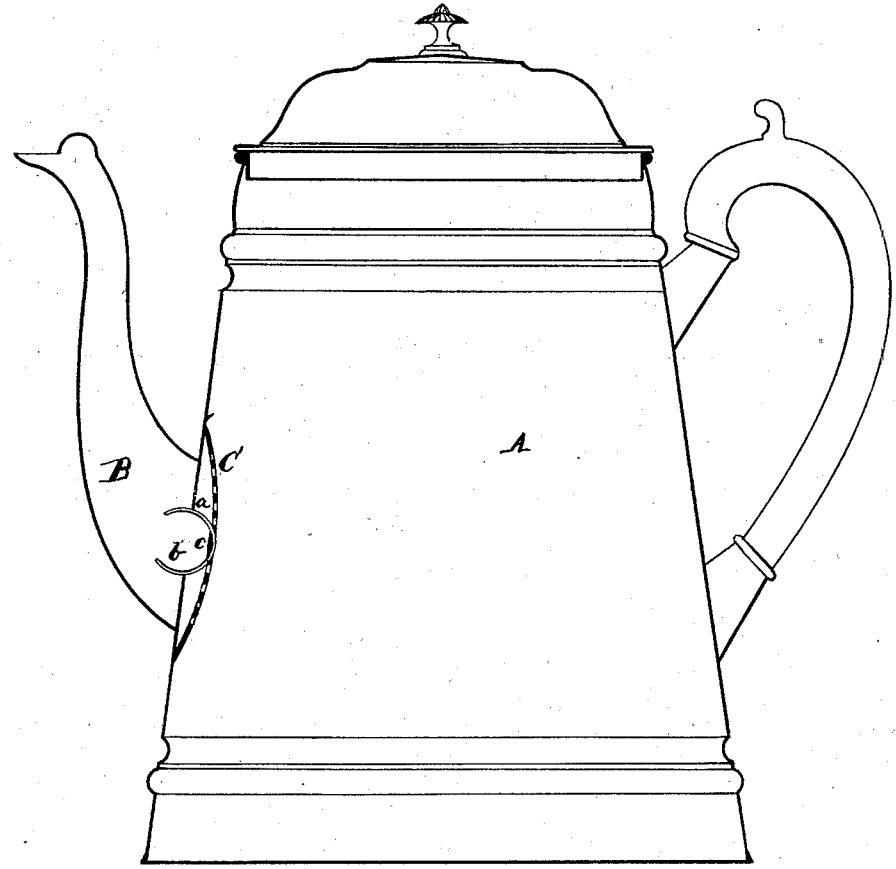
Figure 2:
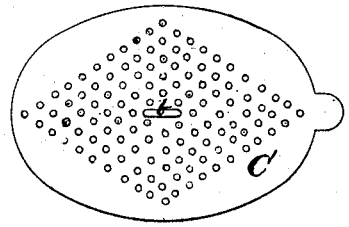

Figure 1 represents a vertical section of my strainer applied to a vessel. Fig. 2 is a plan of the strainer detached.

Similar letters indicate corresponding parts.

Heretofore tea and coffee pots have been provided with a strainer fixed to or upon the inner end of the discharge-spout, so as to be removed and replaced for the purpose of cleaning. In such the strainer has been of hemispherical form, and provided with springs having offsets, which pass outside the wall of the pot at the inner end of the discharge-spout, said springs being fastened opposite each other to the extreme edge of the strainer, portions of said springs being curved to conform to the shape of the interior of the strainer when they project outwardly, and have near their ends the offsets for connecting with the pot as aforesaid.

Such effects its purpose, but is of quite costly and difficult construction, and necessitates the employment of independent springs and a peculiarly-constructed strainer.

My invention is designed to improve upon such; and it consists in constructing the strainer with two openings or eyes at or about the center, through which is inserted an arc-shaped piece of elastic wire, which, by its own elasticity, is firmly retained in its seat on said strainer, so as to have two free arms, which can with ease be attached to or upon the wall of a tea or coffee pot, which projects from the inner end of the discharge-spout.

In the drawing, the letter A designates a pot or vessel, which is provided with a spout, B, and which communicates with said spout by a hole, $a$. With this vessel is combined a strainer, which is composed of a foraminous plate, C, curved to fit the interior of the vessel, and said strainer is provided with an elastic holder, $b$, which fits the hole $a$, so that by pressing the same into said hole the strainer is retained firmly in position.

The holder $b$ consists of an elastic wire, which is passed through an eye, $c$, punched up in the center of the plate C, there seated and retained in place by its own elasticity, or may be fastened by means of solder. The arms or ends of said holder can be readily forced apart or compressed, so that the same adapt themselves to holes of different size.

The curvature of the strainer C can also be changed by hand without difficulty, so that its edge will lie close to the inner surface of the vessel in which the same is to be used.

The great advantage of my strainer is, that the same can be readily secured in any vessel provided with a hole, $a$, for its reception, and when my strainer is taken out, the interior of the vessel can be cleaned without difficulty. Furthermore, my strainer can be made and sold at a very low price, since the spring forming the holder is of a single piece, and all riveting and soldering dispensed with; and, further, it can be applied to and removed from the vessel with the greatest ease.

What I claim as new, and desire to secure by Letters Patent, is—

The combination, with a tea or coffee pot, of the arc-shaped spring $b$ and strainer C, having the openings $c\ c$ at or about its center to receive and seat the spring, as and for the purpose specified.

In testimony that I claim the foregoing I have hereunto set my hand and seal this 10th day of May, 1875.

PETER MICHELS. [L. S.]

Witnesses:
W. HAUFF,
E. F. KASTENHUBER.